(12) United States Patent
Crockett et al.

(10) Patent No.: US 7,283,954 B2
(45) Date of Patent: Oct. 16, 2007

(54) COMPARING AUDIO USING CHARACTERIZATIONS BASED ON AUDITORY EVENTS

(75) Inventors: Brett G. Crockett, Brisbane, CA (US); Michael J. Smithers, San Francisco, CA (US)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 766 days.

(21) Appl. No.: 10/478,397

(22) PCT Filed: Feb. 22, 2002

(86) PCT No.: PCT/US02/05329

§ 371 (c)(1),
(2), (4) Date: Nov. 20, 2003

(87) PCT Pub. No.: WO02/097790

PCT Pub. Date: Dec. 5, 2002

(65) Prior Publication Data

US 2004/0172240 A1    Sep. 2, 2004

Related U.S. Application Data

(63) Continuation-in-part of application No. PCT/US02/04317, filed on Feb. 12, 2002, which is a continuation-in-part of application No. 10/045,644, filed on Jan. 11, 2002, now abandoned, which is a continuation-in-part of application No. 09/922,394, filed on Aug. 2, 2001, now abandoned, which is a continuation of application No. 09/834,739, filed on Apr. 13, 2001, now abandoned, application No. 10/478,397, which is a continuation-in-part of application No. 10/045,644, filed on Jan. 11, 2002, which is a continuation-in-part of application No. 09/922,394, filed on Aug. 2, 2001, which is a continuation of application No. 09/834,739, filed on Apr. 13, 2001.

(60) Provisional application No. 60/351,498, filed on Jan. 23, 2002, provisional application No. 60/293,825, filed on May 25, 2001.

(51) Int. Cl.
*G10L 19/00* (2006.01)
*G10L 11/00* (2006.01)

(52) U.S. Cl. ..................................... 704/216; 704/200
(58) Field of Classification Search ................ 704/216, 704/218, 221, 237, 278, 500, 501, 503, 504, 704/200
See application file for complete search history.

(56) References Cited

U.S. PATENT DOCUMENTS 4,464,784 A    8/1984   Agnello
(Continued)

FOREIGN PATENT DOCUMENTS

EP    0372155    6/1990
(Continued)

OTHER PUBLICATIONS

Fragoulis, D., et al., "On the Automated Recognition of Seriously Distorted Musical Recordings," Apr. 2001, IEEE Transactions on Signal Processing, vol. 49, No. 4, pp. 898-908.*
(Continued)

*Primary Examiner*—Tālivaldis Ivars Šmits
*Assistant Examiner*—Douglas C Godbold
(74) *Attorney, Agent, or Firm*—Gallagher & Lathrop; Thomas A. Gallagher (57) ABSTRACT

A method for determining if one audio signal is derived from another audio signal or if two audio signals are derived from the same audio signal compares reduced-information characterizations of said audio signals, wherein said characterizations are based on auditory scene analysis. The comparison removes from the characterisations or minimizes in the characterisations the effect of temporal shift or delay on the audio signals (5-1), calculates a measure of similarity (5-2), and compares the measure of similarity against a threshold. In one alternative, the effect of temporal shift or delay is removed or minimized by cross-correlating the two characterizations. In another alternative, the effect of temporal shift or delay is removed or minimized by transforming the characterizations into a domain that is independent of temporal delay effects, such as the frequency domain. In both cases, a measure of similarity is calculated by calculating a coefficient of correlation.

11 Claims, 3 Drawing Sheets

U.S. PATENT DOCUMENTS

| | | | |
|---|---|---|---|
| 4,624,009 A | 11/1986 | Glenn et al. | |
| 4,700,391 A | 10/1987 | Leslie, Jr. et al. | |
| 4,703,355 A | 10/1987 | Cooper | |
| 4,723,290 A | 2/1988 | Watanabe et al. | |
| 4,792,975 A | 12/1988 | MacKay | |
| 4,852,170 A | 7/1989 | Bordeaux | |
| 4,864,620 A | 9/1989 | Bialick | |
| 4,905,287 A | 2/1990 | Segawa | |
| RE33,535 E | 2/1991 | Cooper | |
| 5,023,912 A | 6/1991 | Segawa | |
| 5,040,081 A * | 8/1991 | McCutchen | 386/66 |
| 5,092,216 A * | 3/1992 | Wadhams | 84/602 |
| 5,101,434 A | 3/1992 | King | |
| 5,175,769 A | 12/1992 | Hejna, Jr. | |
| 5,202,761 A * | 4/1993 | Cooper | 348/515 |
| 5,216,744 A | 6/1993 | Alleyne | |
| 5,313,531 A | 5/1994 | Jackson | |
| 5,450,522 A * | 9/1995 | Hermansky et al. | 704/200.1 |
| 5,621,857 A | 4/1997 | Cole et al. | |
| 5,730,140 A | 3/1998 | Fitch | |
| 5,749,073 A | 5/1998 | Slaney | |
| 5,781,885 A | 7/1998 | Inoue | |
| 5,828,994 A | 10/1998 | Covell et al. | |
| 5,920,842 A * | 7/1999 | Cooper et al. | 704/503 |
| 5,933,808 A * | 8/1999 | Kang et al. | 704/278 |
| 5,970,440 A | 10/1999 | Veldhuis et al. | |
| 6,002,776 A | 12/1999 | Bhadkamkar et al. | |
| 6,163,614 A | 12/2000 | Chen | |
| 6,188,439 B1 * | 2/2001 | Kim | 348/553 |
| 6,211,919 B1 | 4/2001 | Zink et al. | |
| 6,246,439 B1 * | 6/2001 | Zink et al. | 348/473 |
| 6,266,003 B1 | 7/2001 | Hoek | |
| 6,360,202 B1 | 3/2002 | Bhadkamkar et al. | |
| 6,490,553 B2 | 12/2002 | Van Thong et al. | |
| 6,975,995 B2 * | 12/2005 | Kim | 704/278 |
| 2002/0116178 A1 | 8/2002 | Crockett | |
| 2004/0122662 A1 | 6/2004 | Crockett | |
| 2004/0122772 A1 | 6/2004 | Crockett | |
| 2004/0133423 A1 | 7/2004 | Crockett | |
| 2004/0148159 A1 | 7/2004 | Crockett | |
| 2004/0165730 A1 | 8/2004 | Crockett | |
| 2004/0172240 A1 | 9/2004 | Crockett | |

FOREIGN PATENT DOCUMENTS

| | | |
|---|---|---|
| EP | 0525544 | 2/1993 |
| EP | 0608833 | 8/1994 |
| EP | 0865026 | 9/1998 |
| JP | 1074097 | 3/1989 |
| WO | WO 9119989 | 12/1991 |
| WO | WO 9627184 | 9/1996 |
| WO | WO 9701939 | 1/1997 |
| WO | WO 9820482 | 5/1998 |
| WO | WO 9933050 | 7/1999 |
| WO | WO 0013172 | 3/2000 |
| WO | WO 0019414 | 4/2000 |
| WO | WO 0045378 | 8/2000 |
| WO | WO-02/084645 | 10/2002 |
| WO | WO 02/084645 A2 | 10/2002 |
| WO | WO 02/093560 | 11/2002 |
| WO | WO-02/093560 | 11/2002 |
| WO | WO-02/097702 | 12/2002 |
| WO | WO-02/097790 | 12/2002 |
| WO | WO 02/097791 | 12/2002 |
| WO | WO-02/097791 | 12/2002 |
| WO | WO 02/097792 | 12/2002 |
| WO | WO 05/086139 | 9/2005 |
| WO | WO 06/013287 | 12/2006 |
| WO | WO 07/016107 | 2/2007 |

OTHER PUBLICATIONS

Rummel, R.J., "Understanding Corralation", Availible Feb. 28, 2001, http://www.mega.nu:8080/ampp/rummel/uc.htm#C2.*

Bregman, Albert S., "Auditory Scene Analysis—The Perceptual Organization of Sound," Massachusetts Institute of Technology, 1991, Fourth Printer, 2001, Second MIT Press (Paperback ed.) $2^{nd}$, pp. 468-470.

Dattorro, J., "Effect Design Part 1: Reverberator and Other Filters," 1997, J. Audio Eng. Soc., 45(9):660-684.

Dembo, A., et al., "Signal Synthesis from Modified Discrete Short-Time Transform," 1988, IEEE Trans Acoust., Speech, Signal Processing, ASSP 36(2):168-181.

Fairbanks, G., et al., "Method for Time or Frequency Compression-Expansion of Speech," 1954, IEEE Trans Audio and Electroacoustics, AU-2:7-12.

Griffin D., et al., "Multiband Excitation Vocoder," 1988, IEEE Trans. Acoust., Speech, Signal Processing, ASSP-36(2):236-243.

Laroche, J., "Autocorrelation Method for High Quality Time/Pitch Scaling," 1993, Procs. IEEE Workshop Appl. Of Signal Processing to Audio and Acoustics, Mohonk Mountain House, New Paltz, NY.

Laroche J., et al., "HNS: Speech Modification Based on a Harmonic+Noise Model," 1993a, Proc. IEEE ECASSP-93, Minneapolis, pp. 550-553.

Laroche, J.,"Time and Pitch Scale Modification of Audio Signals," Chapter 7 of"Applications of Digital Signal Processing to Audio and Acoustics," 1998, edited by Mark Kahrs and Karlheinz Brandenburg, Kluwer Academic Publishers.

Lee, F., "Time Compression and Expansion of Speech by the Sampling Method," 1972, J. Audio Eng. Soc., 20(9):738-742.

Lee, S., et al., "Variable Time-Scale Modification of Speech Using Transient Information," 1997, An IEEE Publication, pp. 1319-1322.

Lin, G.J., et al, "High Quality and Low Complexity Pitch Modification of Acoustic Signals," 1995, An IEEE Publication, pp. 2987-2990.

Makhoul, J., "Linear Predication: A tutorial Review," 1975, Proc. IEEE, 63(4):561-580.

Malah D., "Time-Domain Algorithms for Harmonic Bandwidth Reduction and Time Scaling of Speech Signals," 1979, IEEE Trans. On Acoustics, Speech, and Signal Processing ASSP-27(2):113-120.

Marques J., et al., "Frequency-Varying Sinusoidal Modeling of Speech," 1989, IEEE Trans. On Acoustics, Speech and Signal Processing, ASSP-37(5):763-765.

Moorer, J. A., "The Use of the Phase Vocoder in Computer Music Applications," 1978, J. Audio Eng. Soc., 26(1).

Press, William H., et al., "Numerical Recipes in C, The Art of Scientific Computing," 1988, Cambridge University Press, NY, pp. 432-434.

Portnoff, R., "Time-Scale Modifications of Speech Based on Short-Time Fourier Analysis," 1981, IEEE Trans. Acoust., Speech, Signal Processing 29(3):374-390.

Quatierei T., et al., "Speech Transformations Based on a Sinusoidal Representation," 1986, IEEE Trans on Acoustics, Speech and Signal Processing, ASSP-34(6):1449-1464.

Roehrig, C., "Time and Pitch Scaling of Audio Signals," 1990, Proc. $89^{th}$ AES Convention, Los Angeles, Preprint 2954 (E-1).

Roucos, S., et al, "High Quality Time-Scale Modification of Speech," 1985, Proc. IEEE ICASSP-85, Tampa, pp. 493-496.

Shanmugan, K. Sam, "Digital and Analog Communication Systems," 1979, John Wiley & Sons, NY, pp. 278-280.

Schroeder, M., et al., "Band-Width Compression of Speech by Analytic-Signal Rooting," 1967, Proc. IEEE, 55:396-401.

Scott, R., et al., "Pitch-Synchronous Time Compression of Speech," 1972, Proceedings of the Conference for Speech Communication Processing, pp. 63-65.

Seneff, S., "System to Independently Modify Excitation and/or Spectrum of Speech Waveform without Explicit Pitch Extraction," 1982, IEEE Trans. Acoust., Speech, Signal Processing, ASSP-24:358-365.

Suzuki, R., et al., "Time-Scale Modification of Speech Signals Using Cross-Correlation Functions," 1992, IEEE Trans. on Consumer Electronics, 38(3):357-363.

Tan, Roland, K.C., "A Time-Scale Modification Algorithm Based on the Subband Time-Domain Technique for Broad-Band Signal Applications," May 2000, J. Audio Eng. Soc. vol. 48, No. 5, pp. 437-449.

Bristow-Johnson, Robert, "Detailed Analysis of a Time-Domain Formant-Corrected Pitch-Shifting Algorithm," May 1995, J. Audio Eng. Soc., vol. 43, No. 5, pp. 340-352.

George, E Bryan, et al., "Analysis-by-Synthesis/Overlap-Add Sinusoidal Modeling Applied to the Analysis and Synthesis of Musical Tones," Jun. 1992, J. Audio Eng. Soc., vol. 40, No. 6, pp. 497-515.

McAulay, Robert J., "Speech Analysis/Synthesis Based on a Sinusoidal Representation," Aug. 1986, IEEE Transactions on Acoustics, Speech and Signal Processing, vol. ASSP-34, No. 4, pp. 744-754.

Laroche, Jean, "Improved Phase Vocoder Time-Scale Modification of Audio," May 1999, IEEE Transactions on Speech and Audio Processing, vol. 7, No. 3, pp. 323-332.

Slyh, Raymond E., "Pitch and Time-Scale Modification of Speech: A Review of the Literature—Interim Report May 1994-May 1995," Armstrong Lab., Wright-Patterson AFB, OH, Crew Systems Directorate.

Audio Engineering Handbook, K. Blair Benson ed., McGraw Hill, San Francisco, CA 1988, pp. 1.40-1.42 and 4.8-4.10.

Tewfik, A.H., et al., "Enhanced Wavelet Based Audio Coder," Nov. 1, 1993, Signals, Systems and Computers, Conference Record of the 17th Asilomar Conference on Pacific Grove, CA, IEEE Comput. Soc pp. 896-900.

Vafin, R., et al., "Modifying Transients for Efficient Coding of Audio," May 2001, IEEE International Conference on Acoustics, Speech and Signal Processing, pp. 3285-3288, vol. 5.

Vafin, R., et al., Improved Modeling of Audio Signals by Modifying Transient Locations, Oct. 2001, Proceeding of the 2001 IEEE Workshop on the Applications of Signal Processing to Audio and Acoustics, pp. 143-146.

Karjalainen, M., et al., "Multi-Pitch and Periodcity Analysis Model for Sound Separation and Auditory Scene Analysis," Mar. 1999, Proc. ICASSP'99, pp. 929-932.

Levine, S .N., "Effects Processing on Audio Subband Data," 1996, Proc. Int. Computer Music Conf., HKUST, Hong Kong, pp. 328-331.

Levine, S. N., et al., "A Switched Parametric & Transform Audio Coder," Mar. 1999, Proc. ICASSP'99, pp. 985-988.

Mermelstein, P., et al., "Analysis by Synthesis Speech Coding with Generalized Pitch Prediction," Mar. 1999, Proc. ICASSP'99, pp. 1-4.

Pollard, M .P., et al., "Enhanced Shape—Invariant Pitch and Time-Scale Modification for Concatenative Speech Synthesis," Oct. 1996, Proc. Int. Conf. For Spoken Language Processing, ICLSP'96, vol. 3, pp. 1433-1436.

Verma, T. S., et al., An Analysis/Synthesis Tool for Transient Signals that Allows a Flexible Sines+Transients+Noise Model for Audio, May 1998, Proc. ICASSP'98, pp. 3573-3576.

Verma, T. S., et al., "Sinusoidal Modeling Using Frame-Based Perceptually Weighted Matching Pursuits," Mar. 1999 Proc. ICASSP'99, pp. 981-984.

Yim, S., et al., "Spectral Transformation for Musical Tones via Time Domain Filtering," Oct. 1997, Proc. 1997 IEEE Workshop on Applications of Signal Processing to Audio and Acoustics, pp. 141-144.

Edmonds, E. A., et al., "Automatic Feature Extraction from Spectrograms for Acoustic-Phonetic Analysis," 1992 vol. II, Conference B: Pattern Recognition Methodology and Systems, Proceedings, 11th IAPR International Conference on the Hague, Netherlands, USE, IEEE Computer Soc., Aug. 30, 1992, pp. 701-704.

Fishbach, Alon, "Primary Segmentation of Auditory Scenes," 12th IAPR International Conference on Pattern Recognition, Oct. 9-13, 1994, vol. III Conference C: Signal Processing, Conference D: Parallel Computing, IEEE Computer Soc., pp. 113-117.

Dolson, Mark, "The Phase Vocoder: A Tutorial," 1986, Computer Music Journal, 10(4):14-27.

Moulines, E., et al., "Pitch-Synchronous Waveform Processing Techniques for Text-to-Speech Synthesis Using Diphones," 1990, Speech Communication, 9(5/6):453-467.

Serra, X., et al., "Spectral Modeling Synthesis: A Sound Analysis/Synthesis System Based on a Deterministic Plus Stochastic Decomposition," 1990, In Proc. Of Int. Computer Music Conf., pp. 281-284, San Francisco, Ca.

Truax, Barry, "Discovering Inner Complexity: Time Shifting and Transposition with a Real-Time Granulation Technique," 1994, Computer Music J., 18(2):38-48.

Crockett, et al., "A Method for Characterizing and Identifying Audio Based on Auditory Scene Analysis," AES Convention Paper 6416, presented at the 118th Convention May 28-32, 2005, Barcelona, Spain.

* cited by examiner

COMPARING AUDIO USING CHARACTERIZATIONS BASED ON AUDITORY EVENTS

CROSS-REFERENCE TO RELATED APPLICATION

The present application is related to U.S. Non-Provisional patent application Ser. No. 10/474,387, entitled "High Quality Time-Scaling and Pitch-Scaling of Audio Signals," by Brett Graham Crockett, filed Oct. 7, 2003, published as US 2004/0122662 on Jun. 24, 2004. The PCT counterpart application was published as WO 02/084645 A2 on Oct. 24, 2002.

The present application is also related to U.S. Non-Provisional patent application Ser. No. 10/476,347, entitled "Improving Transient Performance of Low Bit Rate Audio Coding Systems by Reducing Pre-Noise," by Brett Graham Crockett, filed Oct. 28, 2003, published as US 2004/0133423 on Jul. 8, 2004. The PCT counterpart application was published as WO 02/093560 on Nov. 21, 2002.

The present application is also related to U.S. Non-Provisional patent application Ser. No. 10/478,398, entitled "Method for Time Aligning Audio Signals Using Characterizations Based on Auditory Events," by Brett Graham Crockett and Michael John Smithers, filed Nov. 20, 2003, published as US 2004/0148159 on Jul. 29, 2004. The PCT counterpart application was published as WO 02/097791 on Dec. 5, 2002.

The present application is also related to U.S. Non-Provisional patent application Ser. No. 10/478,538, entitled "Segmenting Audio Signals into Auditory Events," by Brett Graham Crockett, filed Nov. 20, 2003, published as US 2004/0165730 on Aug. 26, 2004. The PCT counterpart application was published as WO 02/097792 on Dec. 5, 2002.

The present application is also related to U.S. Non-Provisional patent application Ser. No. 10/591,374, entitled "Multichannel Audio Coding," by Mark Franklin Davis, filed Aug. 31, 2006. The PCT counterpart application was published as WO 05/086139 on Sep. 15, 2005.

The present application is also related to PCT Application (designating the U.S.) Ser. No. PCT/US2006/020882 by Alan Jeffrey Seefeldt, Mark Stuart Vinton and Charles Quito Robinson. The PCT counterpart application was published as WO 2006/013287 on Dec. 14, 2006.

The present application is also related to PCT Application (designating the U.S.) Ser. No. PCT/2006/028874, by Alan Jeffrey Seefeldt and Mark Stuart Vinton. filed. The PCT counterpart application was published as WO 07/016107 on Feb. 8, 2007.

TECHNICAL FIELD

The invention relates to audio signals. More particularly, the invention relates to characterizing audio signals and using characterizations to determine if one audio signal is derived from another audio signal or if two audio signals are derived from the same audio signal.

BACKGROUND ART

The division of sounds into units perceived as separate is sometimes referred to as "auditory event analysis" or "auditory scene analysis" ("ASA"). An extensive discussion of auditory scene analysis is set forth by Albert S. Bregman in his book *Auditory Scene Analysis—The Perceptual Organization of Sound*, Massachusetts Institute of Technology, 1991, Fourth printing, 2001, Second MIT Press paperback edition. In addition, U.S. Pat. No. 6,002,776 to Bhadkamkar, et al, Dec. 14, 1999 cites publications dating back to 1976 as "prior art work related to sound separation by auditory scene analysis." However, the Bhadkamkar, et al patent discourages the practical use of auditory scene analysis, concluding that "[t]techniques involving auditory scene analysis, although interesting from a scientific point of view as models of human auditory processing, are currently far too computationally demanding and specialized to be considered practical techniques for sound separation until fundamental progress is made."

Bregman notes in one passage that "[w]e hear discrete units when the sound changes abruptly in timbre, pitch, loudness, or (to a lesser extent) location in space." (*Auditory Scene Analysis—The Perceptual Organization of Sound*, supra at page 469). Bregman also discusses the perception of multiple simultaneous sound streams when, for example, they are separated in frequency.

There are many different methods for extracting characteristics or features from audio. Provided the features or characteristics are suitably defined, their extraction can be performed using automated processes. For example "ISO/IEC JTC 1/SC 29/WG 11" (MPEG) is currently standardizing a variety of audio descriptors as part of the MPEG-7 standard. A common shortcoming of such methods is that they ignore ASA. Such methods seek to measure, periodically, certain "classical" signal processing parameters such as pitch, amplitude, power, harmonic structure and spectral flatness. Such parameters, while providing useful information, do not analyze and characterize audio signals into elements perceived as separate according to human cognition.

Auditory scene analysis attempts to characterize audio signals in a manner similar to human perception by identifying elements that are separate according to human cognition. By developing such methods, one can implement automated processes that accurately perform tasks that heretofore would have required human assistance.

The identification of separately perceived elements would allow the unique identification of an audio signal using substantially less information than the full signal itself. Compact and unique identifications based on auditory events may be employed, for example, to identify a signal that is copied from another signal (or is copied from the same original signal as another signal).

DISCLOSURE OF THE INVENTION

A method is described that generates a unique reduced-information characterization of an audio signal that may be used to identify the audio signal. The characterization may be considered a "signature" or "fingerprint" of the audio signal. According to the present invention, an auditory scene analysis (ASA) is performed to identify auditory events as the basis for characterizing an audio signal. Ideally, the auditory scene analysis identifies auditory events that are most likely to be perceived by a human listener even after the audio has undergone processing, such as low bit rate coding or acoustic transmission through a loudspeaker. The audio signal may be characterized by the boundary locations of auditory events and, optionally, by the dominant frequency subband of each auditory event. The resulting information pattern constitutes a compact audio fingerprint or signature that may be compared to one or more other such audio fingerprints or signatures. A determination that at least a portion of the respective signatures are the same (to a desired degree of confidence) indicates that the related portions of the audio signals from which the respective signatures were derived are the same or were derived from the same audio signal.

The auditory scene analysis method according to the present invention provides a fast and accurate method of comparing two audio signals, particularly music, by comparing signatures based on auditory event information. ASA extracts information or features underlying the perception of similarity, in contrast to traditional methods of feature extraction that extract features less fundamental to perceiving similarities between audio signals (such as pitch amplitude, power, and harmonic structure). The use of ASA improves the chance of finding similarity in material that has undergone significant processing, such as low bit coding or acoustic transmission through a loudspeaker.

Although in principle the invention may be practiced either in the analog or digital domain (or some combination of the two), in practical embodiments of the invention, audio signals are represented by samples in blocks of data and processing is done in the digital domain.

Figure 1A:
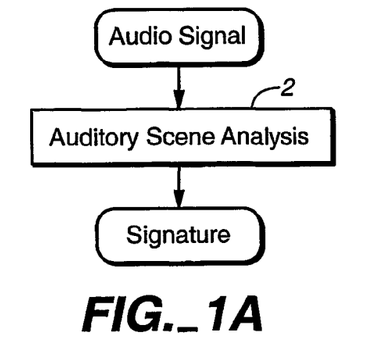
FIG. 1A is a flow chart showing the extraction of a signature from an audio signal in accordance with the present invention. The audio signal may, for example, represent music (e.g., a musical composition or "song").
Figure 1B:
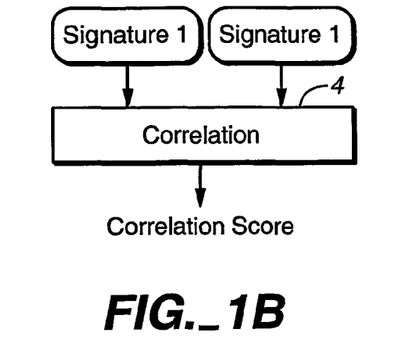
FIG. 1B is a flow chart illustrating the correlation of two signatures in accordance with the present invention.

Referring to FIG. 1A, auditory scene analysis 2 is applied to an audio signal in order to produce a "signature" or "fingerprint," related to that signal. In this case, there are two audio signals of interest. They may be similar in that one may be derived from the other or both may have been previously derived from the same original signal, but this is not known in advance. Thus, auditory scene analysis is applied to both signals. For simplicity, FIG. 1A shows only the application of ASA to one signal. As shown in FIG. 1B, the signatures for the two audio signals, Signature 1 and Signature 2, are applied to a correction or correlation function 4 that generates a correlation score. A user may set a minimum correlation score as providing a desired degree of confidence that at least a portion of the two signatures are the same. In practice, the two signatures may be stored data. In one practical application, one of the signatures may be derived, for example, from an unauthorized copy of a musical work and the other signature may be one of a large number of signatures in a database (each signature being derived from a copyright owner's musical work) against which the unauthorized copy signature is compared until a match, to a desired degree of confidence, if any, is obtained. This may be conducted automatically by a machine, the details of which are beyond the scope of the present invention.

Because the signatures are representative of the audio signals but are substantially shorter (i.e., they are more compact or have fewer bits) than the audio signals from which they were derived, the similarity of the two signatures (or lack thereof) can be determined much faster than it would take to determine the similarity between the audio signals.

Further details of FIGS. 1A and 1B are set forth below.

In accordance with aspects of the present invention, a computationally efficient process for dividing audio into temporal segments or "auditory events" that tend to be perceived as separate is provided.

A powerful indicator of the beginning or end of a perceived auditory event is believed to be a change in spectral content. In order to detect changes in timbre and pitch (spectral content) and, as an ancillary result, certain changes in amplitude, the audio event detection process according to an aspect of the present invention detects changes in spectral composition with respect to time. Optionally, according to a further aspect of the present invention, the process may also detect changes in amplitude with respect to time that would not be detected by detecting changes in spectral composition with respect to time.

In its least computationally demanding implementation, the process divides audio into time segments by analyzing the entire frequency band of the audio signal (full bandwidth audio) or substantially the entire frequency band (in practical implementations, band limiting filtering at the ends of the spectrum are often employed) and giving the greatest weight to the loudest audio signal components. This approach takes advantage of a psychoacoustic phenomenon in which at smaller time scales (20 msec and less) the ear may tend to focus on a single auditory event at a given time. This implies that while multiple events may be occurring at the same time, one component tends to be perceptually most prominent and may be processed individually as though it were the only event taking place. Taking advantage of this effect also allows the auditory event detection to scale with the complexity of the audio being processed. For example, if the input audio signal being processed is a solo instrument, the audio events that are identified will likely be the individual notes being played. Similarly for an input voice signal, the individual components of speech, the vowels and consonants for example, will likely be identified as individual audio elements. As the complexity of the audio increases, such as music with a drumbeat or multiple instruments and voice, the auditory event detection identifies the most prominent (i.e., the loudest) audio element at any given moment. Alternatively, the "most prominent" audio element may be determined by taking hearing threshold and frequency response into consideration.

Optionally, according to further aspects of the present invention, at the expense of greater computational complexity, the process may also take into consideration changes in spectral composition with respect to time in discrete frequency bands (fixed or dynamically determined or both fixed and dynamically determined bands) rather than the full bandwidth. This alternative approach would take into account more than one audio stream in different frequency bands rather than assuming that only a single stream is perceptible at a particular time.

Even a simple and computationally efficient process according to an aspect of the present invention for segmenting audio has been found useful to identify auditory events.

An auditory event detecting process of the present invention may be implemented by dividing a time domain audio waveform into time intervals or blocks and then converting the data in each block to the frequency domain, using either a filter bank or a time-frequency transformation, such as a Discrete Fourier Transform (DFT) (implemented as a Fast Fourier Transform (FFT) for speed). The amplitude of the spectral content of each block may be normalized in order to eliminate or reduce the effect of amplitude changes. The resulting frequency domain representation provides an indication of the spectral content (amplitude as a function of frequency) of the audio in the particular block. The spectral content of successive blocks is compared and a change greater than a threshold may be taken to indicate the temporal start or temporal end of an auditory event.

In order to minimize the computational complexity, only a single band of frequencies of the time domain audio waveform may be processed, preferably either the entire frequency band of the spectrum (which may be about 50 Hz to 15 kHz in the case of an average quality music system) or substantially the entire frequency band (for example, a band defining filter may exclude the high and low frequency extremes).

Preferably, the frequency domain data is normalized, as is described below. The degree to which the frequency domain data needs to be normalized gives an indication of amplitude. Hence, if a change in this degree exceeds a predetermined threshold, that too may be taken to indicate an event boundary. Event start and end points resulting from spectral changes and from amplitude changes may be ORed together so that event boundaries resulting from both types of change are identified.

In practical embodiments in which the audio is represented by samples divided into blocks, each auditory event temporal start and stop point boundary necessarily coincides with a boundary of the block into which the time domain audio waveform is divided. There is a trade off between real-time processing requirements (as larger blocks require less processing overhead) and resolution of event location (smaller blocks provide more detailed information on the location of auditory events).

As a further option, as suggested above, but at the expense of greater computational complexity, instead of processing the spectral content of the time domain waveform in a single band of frequencies, the spectrum of the time domain waveform prior to frequency domain conversion may be divided into two or more frequency bands. Each of the frequency bands may then be converted to the frequency domain and processed as though it were an independent channel. The resulting event boundaries may then be ORed together to define the event boundaries for that channel. The multiple frequency bands may be fixed, adaptive, or a combination of fixed and adaptive. Tracking filter techniques employed in audio noise reduction and other arts, for example, may be employed to define adaptive frequency bands (e.g., dominant simultaneous sine waves at 800 Hz and 2 kHz could result in two adaptively-determined bands centered on those two frequencies).

Other techniques for providing auditory scene analysis may be employed to identify auditory events in the present invention.

BEST MODE FOR CARRYING OUT THE INVENTION

In a practical embodiment of the invention, the audio signal is represented by samples that are processed in blocks of 512 samples, which corresponds to about 11.6 msec of input audio at a sampling rate of 44.1 kHz. A block length having a time less than the duration of the shortest perceivable auditory event (about 20 msec) is desirable. It will be understood that the aspects of the invention are not limited to such a practical embodiment. The principles of the invention do not require arranging the audio into sample blocks prior to determining auditory events, nor, if they are, of providing blocks of constant length. However, to minimize complexity, a fixed block length of 512 samples (or some other power of two number of samples) is useful for three primary reasons. First, it provides low enough latency to be acceptable for real-time processing applications. Second, it is a power-of-two number of samples, which is useful for fast Fourier transform (FFT) analysis. Third, it provides a suitably large window size to perform useful auditory scene analysis.

In the following discussions, the input signals are assumed to be data with amplitude values in the range $[-1,+1]$.

Auditory Scene Analysis 2 (FIG. 1A)

Following audio input data blocking (not shown), the input audio signal is divided into auditory events, each of which tends to be perceived as separate, in process 2 ("Auditory Scene Analysis") of FIG. 1A. Auditory scene analysis may be accomplished by an auditory scene analysis (ASA) process discussed above. Although one suitable process for performing auditory scene analysis is described in further detail below, the invention contemplates that other useful techniques for performing ASA may be employed.

Figure 2:
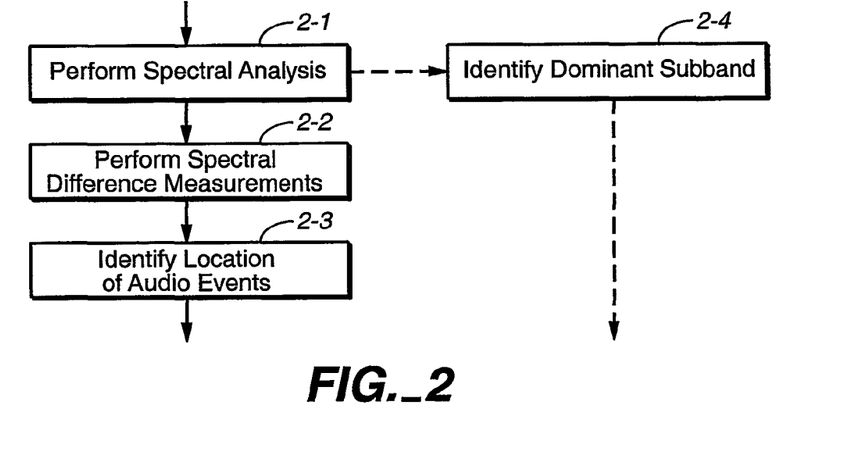
FIG. 2 is a flow chart showing the extraction of audio event locations and the optional extraction of dominant subbands from an audio signal in accordance with the present invention.

FIG. 2 outlines a process in accordance with techniques of the present invention that may be used as the auditory scene analysis process of FIG. 1A. The ASA step or process 2 is composed of three general processing substeps. The first substep 2-1 ("Perform Spectral Analysis") takes the audio signal, divides it into blocks and calculates a spectral profile or spectral content for each of the blocks. Spectral analysis transforms the audio signal into the short-term frequency domain. This can be performed using any filterbank; either based on transforms or banks of band-pass filters, and in either linear or warped frequency space (such as the Bark scale or critical band, which better approximate the characteristics of the human ear). With any filterbank there exists a tradeoff between tune and frequency. Greater time resolution, and hence shorter time intervals, leads to lower frequency resolution. Greater frequency resolution, and hence narrower subbands, leads to longer time intervals.

Figure 3:
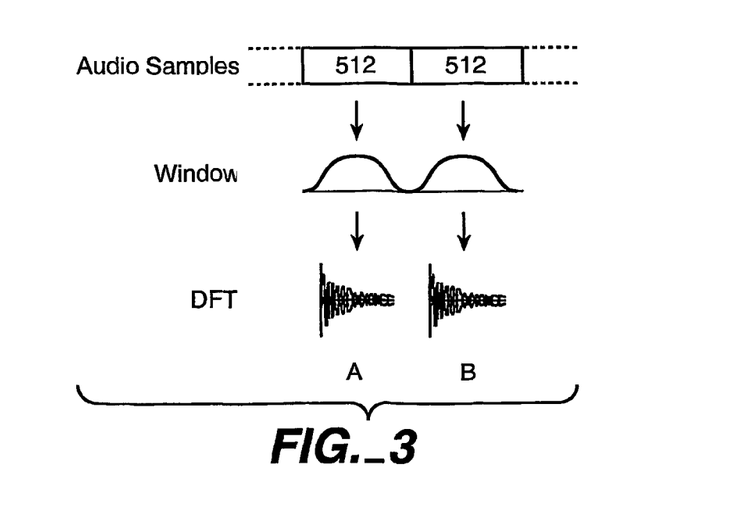
FIG. 3 is a conceptual schematic representation depicting the step of spectral analysis in accordance with the present invention.

The first substep 2-1 calculates the spectral content of successive time segments of the audio signal. In a practical embodiment, described below, the ASA block size is 512 samples of the input audio signal (FIG. 3). In the second substep 2-2, the differences in spectral content from block to block are determined ("Perform spectral profile difference measurements"). Thus, the second substep calculates the difference in spectral content between successive time segments of the audio signal. In the third substep 2-3 ("Identify location of auditory event boundaries"), when the spectral difference between one spectral-profile block and the next is greater than a threshold, the block boundary is taken to be an auditory event boundary. Thus, the third substep sets an auditory event boundary between successive time segments when the difference in the spectral profile content between such successive time segments exceeds a threshold. As discussed above, a powerful indicator of the beginning or end of a perceived auditory event is believed to be a change in spectral content. The locations of event boundaries are stored as a signature. An optional process step 2-4 ("Identify dominant subband") uses the spectral analysis to identify a dominant frequency subband that may also be stored as part of the signature.

In this embodiment, auditory event boundaries define auditory events having a length that is an integral multiple of spectral profile blocks with a minimum length of one spectral profile block (512 samples in this example). In principle, event boundaries need not be so limited.

Either overlapping or non-overlapping segments of the audio may be windowed and used to compute spectral profiles of the input audio. Overlap results in finer resolution as to the location of auditory events and, also, makes it less likely to miss an event, such as a transient. However, as time resolution increases, frequency resolution decreases. Overlap also increases computational complexity. Thus, overlap may be omitted. FIG. 3 shows a conceptual representation of non-overlapping 512 sample blocks being windowed and transformed into the frequency domain by the Discrete Fourier Transform (DFT). Each block may be windowed and transformed into the frequency domain, such as by using the DFT, preferably implemented as a Fast Fourier Transform (FFT) for speed.

The following variables may be used to compute the spectral profile of the input block:

N=number of samples in the input signal
M=number of windowed samples used to compute spectral profile
P=number of samples of spectral computation overlap
Q=number of spectral windows/regions computed In general, any integer numbers may be used for the variables above. However, the implementation will be more efficient if M is set equal to a power of 2 so that standard FFTs may be used for the spectral profile calculations. In a practical embodiment of the auditory scene analysis process, the parameters listed may be set to:

M=512 samples (or 11.6 msec at 44.1 kHz)
P=0 samples (no overlap)

The above-listed values were determined experimentally and were found generally to identify with sufficient accuracy the location and duration of auditory events. However, setting the value of P to 256 samples (50% overlap) has been found to be useful in identifying some hard-to-find events. While many different types of windows may be used to minimize spectral artifacts due to windowing, the window used in the spectral profile calculations is an M-point Hanning, Kaiser-Bessel or other suitable, preferably non-rectangular, window. The above-indicated values and a Hanning window type were selected after extensive experimental analysis as they have shown to provide excellent results across a wide range of audio material. Non-rectangular windowing is preferred for the processing of audio signals with predominantly low frequency content. Rectangular windowing produces spectral artifacts that may cause incorrect detection of events. Unlike certain codec applications where an overall overlap/add process must provide a constant level, such a constraint does not apply here and the window may be chosen for characteristics such as its time/frequency resolution and stop-band rejection.

In substep 2-1 (FIG. 2), the spectrum of each M-sample block may be computed by windowing the data by an M-point Hanning, Kaiser-Bessel or other suitable window, converting to the frequency domain using an M-point Fast Fourier Transform, and calculating the magnitude of the FFT coefficients. The resultant data is normalized so that the largest magnitude is set to unity, and the normalized array of M numbers is converted to the log domain. The array need not be converted to the log domain, but the conversion simplifies the calculation of the difference measure in substep 2-2. Furthermore the log domain more closely matches the log domain amplitude nature of the human auditory system. The resulting log domain values have a range of minus infinity to zero. In a practical embodiment, a lower limit can be imposed on the range of values; the limit may be fixed, for example −60 dB, or be frequency-dependent to reflect the lower audibility of quiet sounds at low and very high frequencies. (Note that it would be possible to reduce the size of the array to M/2 in that the FFT represents negative as well as positive frequencies).

Substep 2-2 calculates a measure of the difference between the spectra of adjacent blocks. For each block, each of the M (log) spectral coefficients from substep 2-1 is subtracted from the corresponding coefficient for the preceding block, and the magnitude of the difference calculated (the sign is ignored). These M differences are then summed to one number. Hence, for the whole audio signal, the result is an array of Q positive numbers; the greater the number the more a block differs in spectrum from the preceding block. This difference measure could also be expressed as an average difference per spectral coefficient by dividing the difference measure by the number of spectral coefficients used in the sum (in this case M coefficients).

Substep 2-3 identifies the locations of auditory event boundaries by applying a threshold to the array of difference measures from substep 2-2 with a threshold value. When a difference measure exceeds a threshold, the change in spectrum is deemed sufficient to signal a new event and the block number of the change is recorded as an event boundary. For the values of M and P given above and for log domain values (in substep 2-1) expressed in units of dB, the threshold may be set equal to 2500 if the whole magnitude FFT (including the mirrored part) is compared or 1250 if half the FFT is compared (as noted above, the FFT represents negative as well as positive frequencies—for the magnitude of the FFT, one is the mirror image of the other). This value was chosen experimentally and it provides good auditory event boundary detection. This parameter value may be changed to reduce (increase the threshold) or increase (decrease the threshold) the detection of events. The details of this practical embodiment are not critical. Other ways to calculate the spectral content of successive time segments of the audio signal, calculate the differences between successive time segments, and set auditory event boundaries at the respective boundaries between successive time segments when the difference in the spectral profile content between such successive time segments exceeds a threshold may be employed.

For an audio signal consisting of Q blocks (of size M samples), the output of the auditory scene analysis process of function 2 of FIG. 1A is an array B(q) of information representing the location of auditory event boundaries where q=0, 1, . . . , Q-1. For a block size of M=512 samples, overlap of P=0 samples and a signal-sampling rate of 44.1 kHz, the auditory scene analysis function 2 outputs approximately 86 values a second. Preferably, the array B(q) is stored as the signature, such that, in its basic form, without the optional dominant subband frequency information, the audio signal's signature is an array B(q) representing a string of auditory event boundaries.

Figure 4A:
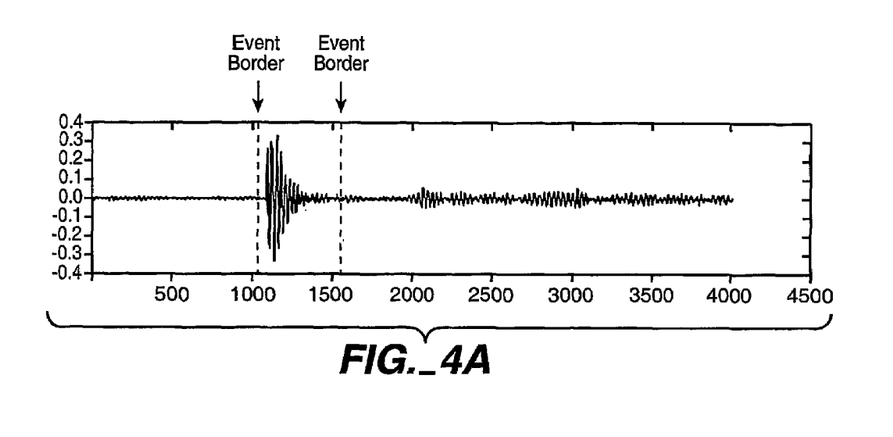
FIGS. 4A and 4B are idealized audio waveforms showing a plurality of audio event locations or event borders in accordance with the present invention.
Figure 4B:
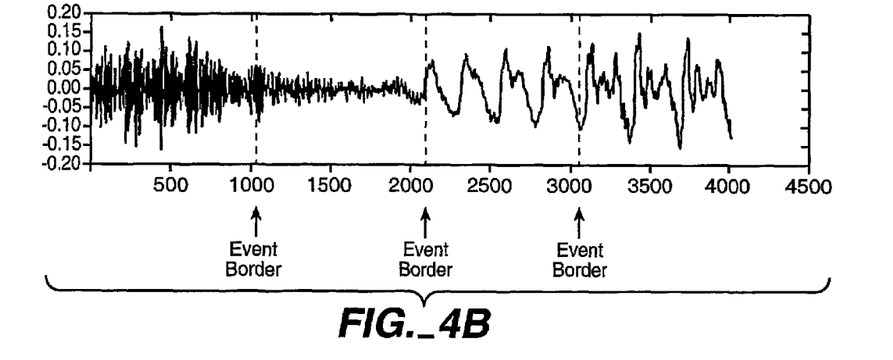

An example of the results of auditory scene analysis for two different signals is shown in FIGS. 4A and 4B. The top plot, FIG. 4A, shows the results of auditory scene processing where auditory event boundaries have been identified at samples 1024 and 1536. The bottom plot, FIG. 4B, shows the identification of event boundaries at samples 1024, 2048 and 3072.

Identify Dominant Subband (Optional)

For each block, an optional additional step in the ASA processing (shown in FIG. 2) is to extract information from the audio signal denoting the dominant frequency "subband" of the block (conversion of the data in each block to the frequency domain results in information divided into frequency subbands). This block-based information may be converted to auditory-event based information, so that the dominant frequency subband is identified for every auditory event. This information for every auditory event provides the correlation processing (described below) with further information in addition to the auditory event boundary information.

The dominant (largest amplitude) subband may be chosen from a plurality of subbands, three or four, for example, that are within the range or band of frequencies where the human ear is most sensitive. Alternatively, other criteria may be used to select the subbands. The spectrum may be divided, for example, into three subbands. The preferred frequency range of the subbands is:

| | |
|---|---|
| Subband 1 | 301 Hz to 560 Hz |
| Subband 2 | 560 Hz to 1938 Hz |
| Subband 3 | 1938 Hz to 9948 Hz |

To determine the dominant subband, the square of the magnitude spectrum (or the power magnitude spectrum) is summed for each subband. This resulting sum for each subband is calculated and the largest is chosen. The subbands may also be weighted prior to selecting the largest. The weighting may take the form of dividing the sum for each subband by the number of spectral values in the subband, or alternatively may take the form of an addition or multiplication to emphasize the importance of a band over another. This can be useful where some subbands have more energy on average than other subbands but are less perceptually important.

Considering an audio signal consisting of Q blocks, the output of the dominant subband processing is an array DS(q) of information representing the dominant subband in each block (q=0, 1, . . . , Q-1). Preferably, the array DS(q) is stored in the signature along with the array B(q). Thus, with the optional dominant subband information, the audio signal's signature is two arrays B(q) and DS(q), representing, respectively, a string of auditory event boundaries and a dominant frequency subband within each block. Thus, in an idealized example, the two arrays could have the following values (for a case in which there are three possible dominant subbands).

In most cases, the dominant subband remains the same within each auditory event, as shown in this example, or has an average value if it is not uniform for all blocks within the event. Thus, a dominant subband may be determined for each auditory event and the array DS(q) may be modified to provide that the same dominant subband is assigned to each block within an event.

Correlation

Figure 5:
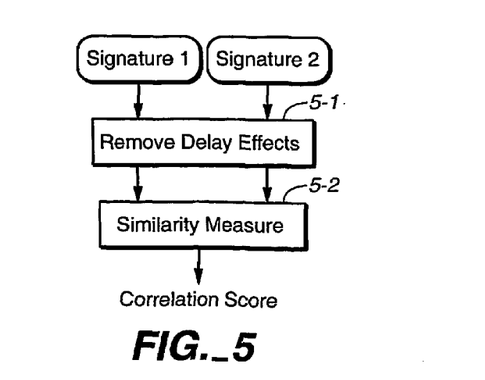
FIG. 5 is a flow chart showing in more detail the correlation of two signatures in accordance with the correlation 4 of FIG. 2 of the present invention.

The determination of whether one signature is the same or similar to another stored signature may be accomplished by a correlation function or process. The correlation function or process compares two signatures to determine their similarity. This may be done in two steps as shown in FIG. 5: a step 5-1 that removes or minimizes the effect of temporal shift or delay on the signatures, followed by a step 5-2 that calculates a measure of similarity between the signatures.

The first-mentioned step 5-1 minimizes the effect of any delay between two signatures. Such delay may have been deliberately added to the audio signal or could be the result of signal processing and/or low bit rate audio coding. The output of this step is two modified signatures in a form suitable for calculation of a measure of their similarity.

The second-mentioned step 5-2 compares the two modified signatures to find a quantitative measure of their similarity (a correlation score). This measure of similarity can then be compared against a threshold to determine if the signatures are the same or different to a desired level of confidence. Two suitable correlation processes or functions are described. Either one of them or some other suitable correlation process or function may be employed as part of the present invention.

First Correlation Process or Function

Removal of Temporal Delay Effects

This correlation function or process isolates a single region or portion from each of the signatures such that these two regions are the most similar portions in the respective signatures and have the same length. The isolated region could be the total overlapping regions between the two signatures, as shown in the examples in FIGS. 6A-D, or the isolated region could be smaller than the overlapping regions.

Figure 6A:
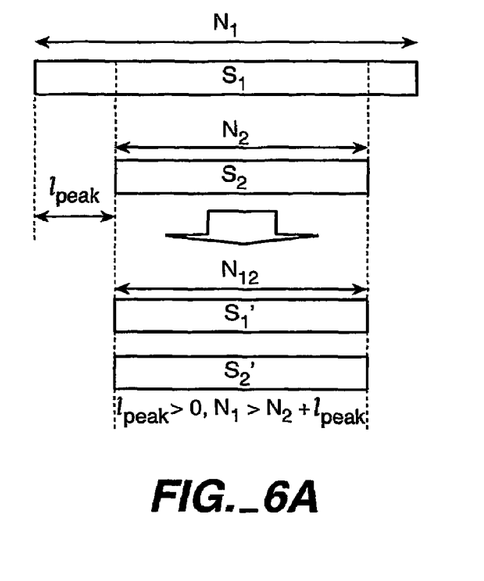
FIGS. 6A-D are conceptual schematic representations of signals illustrating examples of signature alignment in accordance with the present invention. The figures are not to scale. In the case of a digital audio signal represented by samples, the horizontal axis denotes the sequential order of discrete data stored in each signature array.
Figure 6B:
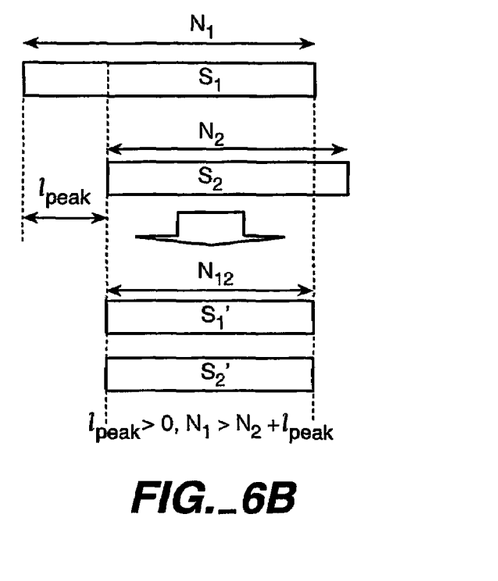
Figure 6C:
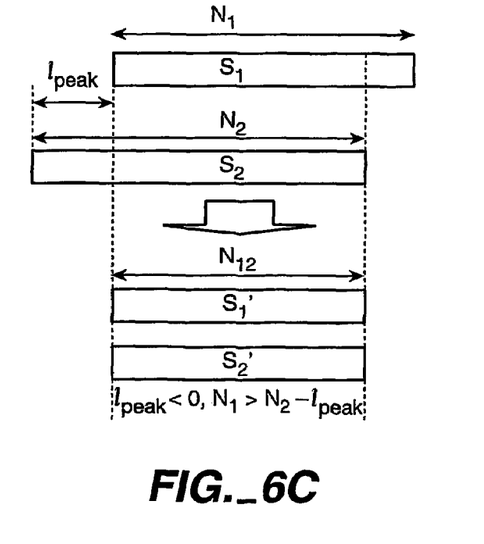
Figure 6D:
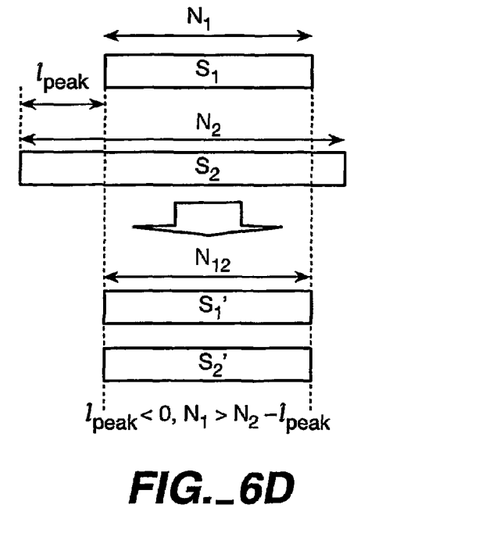

The preferred method uses the whole overlapping region from the two signatures. Some examples are shown in FIG. 6. The overlapping region for the two signatures could be a portion from the end of one signature and the beginning of the other signature (FIGS. 6B and 6C). If one of the signatures is smaller that the other, then the overlapping region between the two signatures could be all of the smaller signature and a portion of the larger signature (FIG. 6A and 6D).

There are a number of different ways to isolate a common region from two arrays of data. A standard mathematical technique involves using the cross correlation to find a lag or delay measure between the arrays of data. When the beginning of each of two arrays of data is aligned, the lag or delay is said to be zero. When the beginning of each of two

| | | | | | | | | | | | | | | | | |
|---|---|---|---|---|---|---|---|---|---|---|---|---|---|---|---|---|
| 1 | 0 | 1 | 0 | 0 | 0 | 1 | 0 | 0 | 1 | 0 | 0 | 0 | 0 | 0 | 1 | 0 | (Event Boundaries) |
| 1 | 1 | 2 | 2 | 2 | 2 | 1 | 1 | 1 | 3 | 3 | 3 | 3 | 3 | 3 | 1 | 1 | (Dominant Subbands) | arrays of data is not aligned, the lag or delay is non-zero. The cross correlation calculates a measure for each possible lag or delay between the two arrays of data: this measure is stored as an array (the output of the cross correlation function). The lag or delay that represents the peak in the cross correlation array is considered to be the lag or delay of one array of data with respect to the other. The following paragraphs expresses such a correlation method in a mathematical form.

Let $S_1$ (length $N_1$) be an array from Signature 1 and $S_2$ (length $N_2$) an array from Signature 2. First calculate the cross-correlation array $R_{E_1 E_2}$ (see, for example, John G. Proakis, Dimitris G. Manolakis, *Digital Signal Processing: Principles, Algorithms, and Applications*, Macmillan Publishing Company, 1992, ISBN 0-02-3396815-X).

$$R_{E_1 E_2}(l) = \sum_{n=-\infty}^{\infty} S_1(n) \cdot S_2(n-l) \quad l = 0, \pm 1, \pm 2, \ldots \quad (1)$$

Preferably, the cross-correlation is performed using standard FFT based techniques to reduce execution time.

Since both $S_1$ and $S_2$ are bounded, $R_{E_1 E_2}$ has length $N_1 + N_2 - 1$. Assuming $S_1$ and $S_2$ are similar, the lag l corresponding to the maximum element in $R_{E_1 E_2}$ represents the delay of $S_2$ relative to $S_1$.

$$l_{peak} = l \text{ for MAX}(R_{E_1 E_2}(l)) \quad (2)$$

Since this lag represents the delay, the common spatial regions or spatially overlapping parts of signatures $S_1$ and $S_2$ are retained as $S'_1$ and $S'_2$; each having the same length, $N_{12}$.

Expressed as equations, the overlapping parts $S'_1$ and $S'_2$ of the signatures $S_1$ and $S_2$ are defined as:

$$S'_1(m) = S_1(n) \begin{cases} l_{peak} \le n < l_{peak} + \text{MIN}(N_1 - l_{peak}, N_2) & m = n - l_{peak} \quad l_{peak} \ge 0 \\ 0 \le n < \text{MIN}(N_1, N_2 + l_{peak}) & m = n \quad l_{peak} < 0 \end{cases}$$

$$S'_2(m) = S_2(n) \begin{cases} 0 \le n < \text{MIN}(N_1 - l_{peak}, N_2) & m = n \quad l_{peak} \ge 0 \\ -l_{peak} \le n < -l_{peak} + \text{MIN}(N_1, N_2 + l_{peak}) & m = n + l_{peak} \quad l_{peak} < 0 \end{cases} \quad (3)$$

The length of $S'_1$ and $S'_2$ is:

$$N_{12} = \begin{cases} \text{MIN}(N_1 - l_{peak}, N_2) & l_{peak} \ge 0 \\ \text{MIN}(N_1, N_2 + l_{peak}) & l_{peak} < 0 \end{cases} \quad (4)$$

First Correlation Process or Function

Similarity Measure

This step compares the two signatures to find a quantitative measure of their similarity. The preferred method uses the coefficient of correlation (Eqn. 5). This is a standard textbook method (William Mendenhall, Dennis D. Wackerly, Richard L. Scheaffer, *Mathematical Statistics with Applications: Fourth Edition*, Duxbury Press, 1990, ISBN 0-534-92026-8).

$$\rho = \frac{\text{Cov}(S'_1, S'_2)}{\sigma_1 \sigma_2} \quad (5)$$

where $\sigma_1$ and $\sigma_2$ are the standard deviations of $S'_1$ and $S'_2$ respectively.

The covariance of $S'_1$ and $S'_2$ is defined as:

$$\text{Cov}(S'_1, S'_2) = \frac{\sum_{m=0}^{N_{12}-1} (S'_1(m) - \mu_1)(S'_2(m) - \mu_2)}{N_{12}} \quad (6)$$

where $\mu_1$ and $\mu_2$ are the means of $S'_1$ and $S'_2$ respectively.

The coefficient of correlation, $\rho$, is in the range $-1 \le \rho \le 1$ where $-1$ and $1$ indicate perfect correlation. Preferably, a threshold is applied to the absolute value of this measure to indicate a correct match.

$$\text{Match} = \begin{cases} \text{TRUE} & \text{abs}(\rho) > \text{threshold} \\ \text{FALSE} & \text{abs}(\rho) \le \text{threshold} \end{cases} \quad (7)$$

In practice, the value of the threshold may be tuned (on a large training set of signatures) to ensure acceptable false rejection and detection rates.

The first correlation process or function is preferred for signatures that have large misalignment or delay, and for signatures in which the length of one signature is significantly smaller than the length of the other signature.

Second Correlation Process or Function

Removal of Temporal Delay Effects

The second correlation process or function transforms the signatures from their current temporal domain into a domain that is independent of temporal delay effects. The method results in two modified signatures that have the same length, such that they can be directly correlated or compared.

There are a number of ways to transform data in such a manner. The preferred method uses the Discrete Fourier Transform (DFT). The DFT of a signal can be separated into magnitude and phase. A spatial shift or time delay of the signal (input to the DFT) alters the phase of the DFT but not the magnitude. Thus the magnitude of the DFT of a signal can be considered as a time-invariant representation of the signal.

This property of the DFT allows each of the two signatures to be transformed into a time-invariant representation. If both signatures have the same length, the magnitude DFT can be directly computed for each of the signatures and the results stored as the modified signatures. If the length of each of the signatures is different, then prior to calculating the DFT, either the longer signature can be truncated to have the same length as the shorter signature, or the shorter signature can be zero padded or extended to have the same length as the longer signature. The following paragraphs express the method in a mathematical form.

Let $S_1$ (length $N_1$) be an array from Signature 1 and $S_2$ (length $N_2$) an array from Signature 2. Firstly, the longer signature is truncated or the shorter signature zero padded such that both signatures have the same length, $N_{12}$. The transformed signature arrays, $S'_1$ and $S'_2$, are created by taking the magnitude DFT as follows:

$$S'_1(k) = \left| \sum_{n=0}^{N_{12}-1} S_1(n) \cdot e^{-j2\pi kn/N_{12}} \right| \quad k = 0, 1, 2, \ldots, N_{12}-1 \quad (8)$$

$$S'_2(k) = \left| \sum_{n=0}^{N_{12}-1} S_2(n) \cdot e^{-j2\pi kn/N_{12}} \right| \quad k = 0, 1, 2, \ldots, N_{12}-1 \quad (9)$$

In practice, for each signature it is beneficial to subtract its mean prior to calculating the DFT. Some windowing may also be applied to the $S_1$ and $S_2$ signatures prior to taking the Discrete Fourier Transform, however in practice no particular windowing has been found to produce the best results.

Second Correlation Process or Function

Similarity Measure

This similarity measure step compares the two signatures to find a quantitative measure of their similarity. The preferred method uses the coefficient of correlation (Eqn. 9). This is a standard textbook method (William Mendenhall, Dennis D. Wackerly, Richard L. Scheaffer, *Mathematical Statistics with Applications: Fourth Edition*, Duxbury Press, 1990, ISBN 0-534-92026-8).

$$\rho = \frac{Cov(S'_1, S'_2)}{\sigma_1 \sigma_2} \quad (9)$$

where $\sigma_1$ and $\sigma_2$ are the standard deviations of $S'_1$ and $S'_2$ respectively.

The covariance of $S'_1$ and $S'_2$ is defined as:

$$Cov(S'_1, S'_2) = \frac{\sum_{k=0}^{N_{12}-1} (S'_1(k) - \mu_1)(S'_2(k) - \mu_2)}{N_{12}} \quad (10)$$

where $\mu_1$ and $\mu_2$ are the means of $S'_1$ and $S'_2$ respectively.

The coefficient of correlation, $\rho$, is in the range $-1 \leq \rho \leq 1$ where $-1$ and $1$ indicate perfect correlation. Preferably, a threshold is applied to the absolute value of this measure to indicate a correct match.

$$Match = \begin{cases} TRUE & abs(\rho) > threshold \\ FALSE & abs(\rho) \leq threshold \end{cases} \quad (11)$$

In practice, the value of the threshold may be tuned (on a large training set of signatures) to ensure acceptable false rejection and detection rates.

In practical applications, many signatures may be stored together to form a library of signatures representing "known" audio content. In this situation, the ability to discriminate between signatures can be improved by calculating a mean signature and subtracting this mean signature from each of two signatures under comparison.

For example, given a database containing W signatures, $S'_0$ to $S'_{W-1}$, the mean signature is calculated as follows.

$$S'_{MEAN}(k) = \frac{1}{W} \sum_{w=0}^{W-1} S'_w(k) \quad k = 0, 1, 2, \ldots, N_{12}-1 \quad (12)$$

When comparing two signatures (even if one of the signatures is not in the library) the mean signature is subtracted from both signatures prior to calculating the covariance (subsequently used in the coefficient of correlation). The covariance becomes:

$$Cov(S'_1, S'_2) = \quad (13)$$

$$\frac{\sum_{k=0}^{N_{12}-1} [(S'_1(k) - S'_{MEAN}(k)) - \mu_1] \cdot [(S'_2(k) - S'_{MEAN}(k)) - \mu_2]}{N_{12}}$$

where $\mu_1$ and $\mu_2$ are the means of $S'_1 - S'_{MEAN}$ and $S'_2 - S'_{MEAN}$ respectively.

The second correlation process or function is preferred for signatures that have small misalignment or delay, and for signatures where the lengths of the signatures are similar. It is also significantly faster than the first correlation process or function. However since some information is inherently lost (by discarding the phase of the DFTs), it results in a slightly less accurate measure of similarity.

Applications

As briefly mentioned earlier, an application of this invention is searchable audio databases; for example a record company's library of songs. Signatures could be created for all the songs from the library and the signatures stored in a database. This invention provides a means for taking a song of unknown origin, calculating its signature and comparing its signature very quickly against all the signatures in the database to determine the identity of the unknown song.

In practice, the accuracy of (or confidence in) the similarity measure is proportional to the size of the signatures being compared. The greater the length of the signatures, the greater the amount of data being used in the comparison and hence the greater the confidence or accuracy in the similarity measure. It has been found that signatures generated from about 30 seconds of audio provide for good discrimination. However the larger the signatures, the longer the time required to perform a comparison.

CONCLUSION

It should be understood that implementation of other variations and modifications of the invention and its various aspects will be apparent to those skilled in the art, and that the invention is not limited by these specific embodiments described. It is therefore contemplated to cover by the present invention any and all modifications, variations, or equivalents that fall within the true spirit and scope of the basic underlying principles disclosed and claimed herein.

The present invention and its various aspects may be implemented as software functions performed in digital signal processors, programmed general-purpose digital computers, and/or special purpose digital computers. Interfaces between analog and digital signal streams may be performed in appropriate hardware and/or as functions in software and/or firmware.

The invention claimed is:

1. A method for determining if one audio signal is derived from another audio signal or if two audio signals are derived from the same audio signal, comprising comparing reduced-information characterizations of said audio signals, wherein said reduced-information characterizations represent at least the boundaries of auditory events resulting from the division of each of said audio signals into auditory events, each of which auditory events tends to be perceived as separate and distinct, wherein each audio signal is divided into auditory events by detecting changes in signal characteristics with respect to time in the audio signal, and identifying a continuous succession of auditory event boundaries in the audio signal, in which every change in signal characteristics with respect to time exceeding a threshold defines a boundary, wherein each auditory event is an audio segment between adjacent boundaries and there is only one auditory event between such adjacent boundaries, each boundary representing the end of the preceding event and the beginning of the next event such that a continuous succession of auditory events is obtained, wherein neither auditory event boundaries, auditory events, nor any characteristics of an auditory event are known in advance of identifying the continuous succession of auditory event boundaries and obtaining the continuous succession of auditory events.

2. The method of claim 1 wherein said comparing includes removing from the characterizations or minimizing in the characterizations the effect of temporal shift or delay an the audio signals, calculating a measure of similarity, and comparing the measure of similarity against a threshold.

3. The method of claim 2 wherein said removing identifies a portion in each of said characterizations, such that the respective portions are the most similar portions in the respective characterizations and the respective portions have the same length.

4. The method of claim 3 wherein said removing identifies a portion in each of said characterizations by performing a cross-correlation.

5. The method of claim 4 wherein said calculating calculates a measure of similarity by calculating a coefficient of correlation of the identified portion in each of said characterizations.

6. The method of claim 2 wherein said removing transforms die characterizations into a domain that is independent of temporal delay effects.

7. The method of claim 6 wherein said removing transforms the characterizations into the frequency domain.

8. The method of claim 7 wherein said calculating calculates a measure of similarity by calculating a coefficient of correlation of an identified portion in each of said characterizations.

9. The method of claim 1 wherein one of said characterizations is a characterization from a library of characterizations representing known audio content.

10. The method of claim 9 further comprising subtracting a mean of the characterizations in said library from bath characterizations after said removing and prior to said comparing.

11. The method of claim 1 wherein said reduced-information characterizations also represent the dominant frequency subband of auditory events.

* * * * *